United States Patent [19]

Okazaki et al.

[11] Patent Number: 4,909,923

[45] Date of Patent: Mar. 20, 1990

[54] METHOD FOR HYDROGENATION OF COAL TAR PITCH

[75] Inventors: Hiroshi Okazaki, Munakata; Tadashi Komoto, Kitakyushu; Munekazu Nakamura, Yokohama; Osamu Togari, Yokohama; Noriyuki Yoneda, Yokohama; Haruhiko Yoshida, Kawasaki; Hideki Hashimoto, Tokyo, all of Japan

[73] Assignees: Nippon Steel Chemical Co., Ltd., Tokyo; Chiyoda Chemical Engineering & Construction Co., Ltd., Yokohama, both of Japan

[21] Appl. No.: 4,168

[22] Filed: Jan. 15, 1987

Related U.S. Application Data

[63] Continuation-in-part of Ser. No. 746,958, Jun. 20, 1985, abandoned.

[30] Foreign Application Priority Data

| Jun. 22, 1984 | [JP] | Japan | 59-127625 |
| Jun. 22, 1984 | [JP] | Japan | 59-127626 |
| Aug. 17, 1984 | [JP] | Japan | 59-171369 |
| Aug. 17, 1984 | [JP] | Japan | 59-171370 |
| Oct. 30, 1984 | [JP] | Japan | 59-226368 |

[51] Int. Cl.$^4$ .................... C10C 1/20; C10C 3/02
[52] U.S. Cl. ........................ 208/44; 208/39; 208/22
[58] Field of Search ......................... 208/39, 44

[56] References Cited

U.S. PATENT DOCUMENTS

| 3,453,202 | 7/1969 | Friedman et al. | 208/44 |
| 3,600,298 | 8/1971 | Magumi et al. | 208/44 |
| 4,101,416 | 7/1978 | Dolbear | 208/44 |
| 4,155,832 | 5/1979 | Cox et al. | 208/44 |
| 4,328,090 | 5/1989 | Stuckey, Jr. et al. | 208/44 |
| 4,387,256 | 6/1983 | Henderson et al. | 208/44 |
| 4,460,557 | 7/1984 | Takashima et al. | 208/39 |
| 4,590,055 | 5/1986 | Yamada et al. | 208/44 |

FOREIGN PATENT DOCUMENTS

| 1212976 | 8/1984 | German Democratic Rep. | 208/44 |
| 11602 | 3/1974 | Japan | 208/44 |
| 51-24622 | 2/1976 | Japan | 208/44 |
| 1214531 | 12/1983 | Japan | 208/44 |
| 122586 | 7/1984 | Japan | 208/44 |

*Primary Examiner*—Helen M. S. Sneed
*Assistant Examiner*—Helane Myers
*Attorney, Agent, or Firm*—Gordon W. Hueschen

[57] ABSTRACT

A method for the hydrogenation of coal tar pitch which comprises subjecting said coal tar pitch containing toluene insolubles to slight hydrogenation in the presence of a hydrogenation catalyst having carried on a refractory inorganic oxide carrier at least one member selected from the class consisting of elemental metals, belonging to Groups VI B and VIII in the Periodic Table and oxides and sulfides thereof, under the conditions of 280° to 400° C. of reaction temperature, 20 to 200 kg/cm$^2$. G of hydrogen pressure, 0.1 to 10 hr$^{-1}$ of LHSV, and 500 to 2,000 Nl/liter of hydrogen to liquid ratio, and a catalyst therefor. The "slight" hydrogenation is hydrogenation to a degree such that the difference of hydrogen to carbon atomic ratio between the untreated coal tar pitch and the hydrogenated coal tar pitch falls in the range of 0.03 to 0.5. The coal tar pitch can be coal tar pitch itself, coal tar pitch pretreated for the removal of organic sodium compounds, or pretreated for the removal of quinoline insolubles and, preferably, the coal tar pitch has a density in the range of 1.13 to 1.17 g/cm$^2$ at 40 degrees C.

9 Claims, 2 Drawing Sheets

METHOD FOR HYDROGENATION OF COAL TAR PITCH

This is a continuation-in-part of application Ser. No. 746,958, filed June 20, 1985, which is abandoned.

BACKGROUND OF THE INVENTION

1. Field of the Invention:

This invention relates to a method for the hydrogenation of coal tar pitch. Particularly, this invention relates to a method for the hydrogenation of coal tar pitch, specifically the conversion of coal tar pitch containing a large amount of toluene insolubles to slightly hydrogenated coal tar pitch useful as a carbonaceous raw material. More particularly, this invention relates to a method for commercially advantageous manufacture of a carbonaceous raw material possessing a structure having nuclei partially hydrogenated while retaining polycyclic condensation configuration intact, containing hetero atoms such as nitrogen, sulfur, oxygen, and metals at low concentrations, and possessing properties for needle coke, carbon fibers of high quality and pitch coke.

2. Description of the Prior Art:

It is known that tar pitch is excellent as a carbonaceous raw material for pitch coke, particularly needle coke and carbon fibers, is obtained by hydrogenating coal tar pitch. Generally, this hydrogenation is effected to a slight extent.

For example, it is disclosed in the specification of GB No. 2129825 that pitch is slightly hydrogenated as with tetrahydroquinoline for the production raw material for carbon fibers. In the specification of Japanese Patent Publication No. 49(1974)-11,602, it is stated that as a means of producing needle coke from coal tar pitch, slight hydrogenation performed on the pitch gives rise to tar pitch capable of producing needle coke excellent in quality.

In the hydrogenation of coal tar pitch, it is naturally a prerequisite that the hydrogenated product should possess high quality. Still more important is a crucial requirement that the hydrogenation carried out on a commerical scale should enable the product to be continuously obtained with stable quality over a long period of time. In the treatment of virgin-type heavy petroleum oil, the hydrogenation of slight degree as contemplated by this invention poses no problem concerning continuous protracted production. This is because, in the case of a heavy fraction of virgin oil, the main causes for deactivation of the catalyst used in the treatment reside chiefly in vanadium and nickel and the slight hydrogenation has no possibility of appreciably deactivating the catalyst and enables the product to be obtained with stable quality for a long time.

The coal tar pitch which this invention intends to use as the raw material has different nature from the heavy fraction of virgin oil. Unlike the heavy fraction of oil, coal tar pitch contains virtually no vanadium or nickel and avoids entailing deactivation of the catalyst by such heavy metals. It nevertheless contains, in large amounts, toluene insolubles (hereinafter referred to as "TI") which are contained very little in the heavy fraction of virgin type petroleum oil. This TI induces heavy deposition of carbon on the catalyst and in the interparticles of the catalyst and deactivates the catalyst very quickly so as to render continuous catalytic hydrogenation substantially impracticable.

If the TI is removed from the coal tar pitch for the prevention of the catalyst deactivation, the catalyst used in the hydrogenation enjoys an elongation in its service life. As described afterward, however, this treatment of coal tar pitch for removal of the TI obstructs fulfillment of the primary object of producing a carbonaceous raw material of high quality because it inevitably results in removal of those components which possess the basic structure of a polycyclic condensation configuration like TI and which are transformed after the partial hydrogenation into substances possessing properties of high quality for a carbonaceous raw material.

For the reasons given above, the slight hydrogenation of coal tar pitch carried out continuously in the presence of a catalyst for a long period encounters a serious hindrance. In the circumstance, a method which effects the hydrogenation by using such an expensive hydrogen donating solvent as tetrahydroquinoline instead of using any catalyst has been proposed as disclosed in GB No. 2129825, for example. The use of this hydrogen donating solvent not merely renders the treatment expensive but also tends to provide removal of hetero atoms and modification of quality by hydrogenation both insufficiently because the action of hydrogenation manifested on pitch is weak.

Japanese Patent Publication No. SHO 49(1974)-11,602 discloses catalytic hydrogenation. All the working examples cited therein invariably cover reactions carried out batchwise in an autoclave. No continuous operation performed for a long period is mentioned anywhere.

It is, therefore, extremely important to continue a study and develop a method which effects hydrogenation of pitch by using a catalyst of high performance capable of keeping a catalytic activity at a high level even on pitch without inducing deposition of carbon and the optimum conditions of hydrogenation incapable of deactivating the catalyst.

SUMMARY OF THE INVENTION

The inventors continued a diligent study for a method capable of effecting treatment of coal tar pitch in the presence of a catalyst of high performance appropriate for slight hydrogenation of coal tar pitch containing TI in a large amount under the optimum conditions of hydrogenation incapable of deactivating the catalyst. We have fulfilled this task by the following method and brought about completion of this invention. Namely, this invention concerns a method for effecting slight hydrogenation of coal tar pitch containing a TI component in the presence of a hydrogenation catalyst having carried on a refractory inorganic oxide carrier at least one member selected from the class consisting of metals, oxides, and sulfides of the metal elements belonging to Group VI B and Group VIII in the Periodic Table under the conditions of 280° to 400° C. of reaction temperature, 20 to 200 kg/cm$^2$·G of hydrogen pressure, 0.1 to 10 l/l·hr (hereinafter referred as "hr$^{-1}$") of LHSV, and 500 to 2000 Nl/lit. of hydrogen to liquid ratio.

DESCRIPTION OF PREFERRED EMBODIMENT

The term "coal tar pitch" used in this invention designates the coal tar itself which is obtained by coking or liquifying of coal or the heavy composition or residue of the coal tar and, particularly for use as a carbonaceous raw material, the component containing at least 3%, preferably at least 8%, and not more than about 60% of TI (which are substantially condensed high molecular hydrocarbonous substances insoluble in toluene as a solvent). Typical examples of the coal tar pitch are soft pitch having a softening point of not more than 70° C., medium pitch having a softening point in the range of about 70° to 85° C., and hard pitch having a softening point of not less than 85° C. Soft pitch having a softening point in the range of about 0° to 70° C. proves particularly desirable. The pitch of this grade can be obtained by controlling the distilling temperature of coal tar or by cut back heavy oil to pitch of high softening point.

Generally, coal tar pitch contains quinoline insolubles (hereinafter referred to as "QI") at a concentration in the range of 1 to 5% by weight, TI in the range of 5 to 60% by weight, sulfur in the range of 0.2 to 1% by weight, and nitrogen in the range of 0.5 to 2% by weight, and a hydrogen/carbon (H/C) atomic ratio in the range of 0.5 to 0.7.

By the method of this invention, catalytic hydrogenation can be carried out continuously for a long time on any coal tar pitch of the grade described above. When one of the following types of coal tar pitch is used in the hydrogenation of this invention, there are derived desirable effects such as extension of the service life of the catalyst.

(1) Coal tar pitch from which at least part of the organic sodium compounds contained therein have been removed.

(2) Coal tar pitch from which at least part of QI contained therein has been removed.

(3) Coal tar pitch obtained by selectively distilling coal tar of higher specific gravity.

Generally when coal tar is distilled, an alkali such as sodium hydroxide, potassium hydroxide, sodium carbonate, or potassium carbonate is added to the coal tar under treatment in an amount of 50 to 1,000 ppm, preferably 100 to 500 ppm, for the purpose of preventing corrosion by organic acids in the coal tar. In this case, the added alkali reacts with oxygen-containing compounds in the coal tar to induce secondary production such as sodium phenolate and sodium naphthenate, which remains in the coal tar pitch. These organic sodium compounds function as catalyst poisons during the course of the hydrogenation and deactivate the catalyst. Thus, in coal tar pitch it is desirable to remove such sodium compounds.

The removal of such organic sodium compounds is carried out advantageously under high temperature, optionally under hydrogen pressure while the coal tar pitch is contacted to a porous inorganic oxide or a porous inorganic oxide having carried thereon a metallic component active for hydrogenation. By this treatment, the organic sodium compounds in the coal tar pitch are decomposed or expelled and, at the same time, the metal compounds of iron, arsenic, chromium, and germanium which originate in the oil as the raw material and which are factors responsible for deactivation of the catalyst are decomposed or removed. The porous inorganic oxide to be used for this treatment can be any of various known carriers, for example. Concrete examples of the porous inorganic oxide include synthetic products such as $\gamma$-alumina, $\alpha$-alumina, silica, magnesia, boria, zirconia, phosphia, chromia, titania, silica-alumina, alumina-boria, alumina-phosphia, silica-magnesia, synthetic zeolite, and synthetic sepiolie, and natural products such as sepiolite, pumice, zeolite, bauxite, attapulgite, kaolin, and montmorillonite. In the present invention, the porous inorganic oxide or the porous inorganic oxide having carried thereon a metallic component active for hydrogenation can be used in any of various molded forms such as powders, pellets and granules. For the purpose of preventing occurrence of pressure drop in the catalyst bed, it is particularly advantageous to use this porous inorganic oxide in the shape of a hollow tubes, rods of an elliptic cross section, multified leaves, and other shapes obtainable by extrusion molding. The size of the porous inorganic oxide generally falls in the range of 0.8 to 6.2 mm, preferably 1.0 to 3.1 mm, though variable with the type of the reaction bed.

Optionally, this treatment may be carried out under hydrogen pressure. In this case, although it is advantageous to use the porous inorganic oxide which has a metallic component active for hydrogenation carried thereon. The metallic component active for hydrogenation can be any of the known metallic components possessed of the activity mentioned. For example, at least one metal selected from the class consisting of metals belonging to Group I, Group V, Group VI, and Group VIII in the Periodic Table. Typical examples of the metal include copper, vanadium, molybdenum, tungsten, cobalt, nickel, and iron. The form in which the metallic component active for hydrogenation is carried on the porous inorganic oxide is metal, oxide, sulfide, etc. In terms of activity and service life, the form of sulfide is more advantageous. The amount of this metallic component is in the range of 0.5 to 20% by weight, desirably 1 to 13% by weight, and more desirably 1.5 to 8.5% by weight, as metal oxide based on the porous inorganic oxide.

The treatment does not particularly require a supply of hydrogen. Thus, it is economical to effect removal of sodium while repressing the hydrogenation occurring as a secondary reaction to the fullest possible extent. When this treatment for the removal of organic sodium compounds is carried out under hydrogen pressure, the undersired phenomenon of coking can be repressed.

The aforementioned porous inorganic oxide or the porous inorganic oxide having carried thereon the metallic component active for hydrogenation is desired to possess physical properties on the order 0.3 to 1.5 cc/g of pore volume, 100 to 250 m$^2$/g of surface area, and 50 to 150 Å of pore diameter to be used effectively.

For the treatment for removal of organic sodium compounds to proceed smoothly, the reaction temperature is in the range of 150° to 450° C., preferably 250° to 400° C. and the liquid space hourly velocity (LHSV) in the range of 0.3 to 20 Hr$^{-1}$, preferably 0.8 to 10 Hr$^{-1}$. If the temperature is excessively low, no effective decomposition or removal of organic sodium compounds is attained. If it is excessively high, such secondary reactions as coking are induced. When no hydrogen pressure is used, the reaction pressure selected in the range from atmospheric pressure to about 30 kg/cm$^2$·G is used. Where hydrogen pressure is used, it is selected in the range of 1 to 200 kg/cm$^2$·G to be used advantageously. In this case, the ratio of hydrogen to coal tar pitch is desired to fall in the range of 20 to 2000 Nl/liter.

This treatment for removal of organic sodium compounds can be effectively carried out by any of flow reaction methods in popular use such as fixed bed, moving bed, fluidized bed, and ebullited bed.

The treatment for removal of organic sodium compounds is desired to be performed with the ratio of removal of sodium fixed at a level exceeding 80% by weight, so that the product formed by this treatment will have a sodium content of not more than 10 ppm.

The coal tar pitch contains QI such as free carbon, coke dust and coal dust even when no alkali agent is added during the distillation of coal tar, and others. It contains QI such as inorganic alkali compounds in addition when an alkali agent is added. Since these QI components plug the bed of hydrogenation catalyst and jeopardize stable production of hydrogenated coal tar pitch as a carbonaceous raw material, they are desired to be removed in advance from the coal tar pitch. In the treatment for removal of QI, however, precautions should be exercised to avoid additionally expelling those components such as TI or HI (hexane insolubles) which possess a polycyclic condensation configuration and, after partial hydrogenation, give rise to components desirable for a carbonaceous raw material. For the produced carbonaceous raw material to acquire high quality, the ratio of residual TI is required to exceed 80%.

The removal of QI to less than about 1000 ppm can be effectively carried out mechanically as by filtration or centrifugal separation. A method which attains separation and removal of QI from the coal tar pitch to this extent, is disclosed in U.S. Pat. No. 4,116,815 and U.S. Pat. No. 4,127,472. The treatment comprises adding to the pitch a mixed solvent for the coal tar pitch comprising an aliphatic solvent, such as, hexane, octane, kerosene, naptha, or butanol and an aromatic solvent, such as, benzene, toluene, methyl naphthalene, or phenol, thereby causing QI to be precipitated in conjunction with the components insoluble in the mixed solvent and can be used effectively and, more advantageously, commercially in the pretreatment. By this treatment for removal of QI, free carbon, clayish substance, and salts, which exist in the coal tar as solids insoluble in the mixed solvent, are removed. The treated coat tar pitch exhibits properties generally on the order of not more than 1000 ppm, preferably not more than 300 ppm of solids and 10 to 100 ppm of organic alkali metal compounds.

The coal tar pitch to be hydrogenated is desirably obtained by distilling coal tar of high density. The coal tar has its properties varied by such factors as the type of coal and the temperature of coking of coal, for example. The density thereof is variable at 40° C. roughly in the range of 1.13 to 1.17 g/cm$^3$. Preferably, the coal tar pitch to be used is allowed to have higher density than that used in the conventional method. Preferably, the density of the coal tar to be used has density of not less than 1.150 g/cm$^3$ at 40° C. The coal tar pitch derived from the coal tar having this density has a comparatively low sodium content and, therefore, has a lesser possibility of deactivating the catalyst.

In the distillation of coal tar, two or more distillation columns are used, the coal tar pitch may be obtained by feeding coal tar of high density concentrically to one of the two or more distillation columns and distilling it therein. Where just one distillation column is used, the coal tar pitch produced during the distillation of coal tar of high density may be obtained as distinguished from the coal tar pitch produced during the distillation of coal tar of lower density. Preferably in this case, the distillation is carried out by selecting coal tar having high density surpassing a predetermined level and performing distillation concentrically on the collected coal tar.

This invention contemplates performing slight hydrogenation on the coal tar pitch in the presence of a hydrogenation catalyst. The coal tar pitch to be used in this invention may be the coal tar pitch itself which is obtained by distilling coal tar. Preferably, it may be (1) coal tar pitch which has undergone the treatment for removal of organic sodium compounds, (2) coal tar pitch which has undergone the treatment for removal of QI, or (3) coal tar pitch obtained by selecting coal tar of high specific gravity and distilling the selected coal tar. Otherwise, it may be two or more of the treatments enumerated above. It is to be observed that in none of these is there alkylation of the coal tar pitch.

The catalyst to be used for this invention is a hydrogenation catalyst which has carried on a refractory inorganic oxide carrier at least one compound selected from the class consisting of metals, oxides, and sulfides of the elements belonging to Group VI B and Group VIII in the Periodic Table. The refractory inorganic oxide is not specifically limited. Typical examples of the refractory inorganic oxide usable effectively herein include alumina, silica, boria, phosphia, zirconia, chromia, magnesia, and titania. It is also permissible to use such refractory inorganic oxides in suitable combinations such as, for example, silica-alumina, alumina-boria, aluminaphosphia, and silica-magnesia. Preferably this oxide is composed mainly of alumina or silica. The oxide composed mainly of alumina is the best selection. The metal is desired to be molybdenum-nickel, molybdenum-cobalt, or molybdenum-nickel-cobalt. The total amount of the metal is desired to fall in the range of 7.5 to 35%, preferably 15 to 35% by weight, as the oxide. The amount of metal is desired to be larger than the catalyst used in the hydrogenation of pitch of a petroleum origin. The catalyst is desired to be put to use after presulfiding effected by any of the known methods, so that the metal on the catalyst will be used in the form of a sulfide. Since the average molecular weight of coal tar pitch falls roughly in the range of 200 to 400, the properties of the catalyst are desired to be on the order of 50 to 150 Å of average pore diameter, 50 to 300 m$^2$/g of surface area, and not less than 0.3 cc/g, preferably 0.3 to 1.5 cc/g, of pore volume.

Particularly, the catalyst functions effectively when it fulfills the following requirements.

(a) The pore volume should be not less than 0.3 cc/g, preferably not less than 0.34 cc/g.

(b) The average pore diameter should fall in the range of 50 to 150 Å, preferably 80 to 150 Å.

(c) As metal element for the catalyst, a metal of Group VIB should be contained in an amount falling in the range of 7.5 to 30% by weight, preferably 12 to 20% by weight, as metal oxide and a metal of Group VIII in an amount of not less than 1.5% by weight, preferably in the range of 1.5 to 6% by weight, as metal oxide.

(d) The main component of the carrier should be alumina.

The catalyst to be used in this invention possesses specific properties as described above. Even when this catalyst is used in the hydrogenation of any pitch which contains TI, components liable to induce deposition of carbon on a catalyst, therefore, it exhibits an outstanding property of lessening deactivation of catalyst and enabling hydrogenation of pitch to proceed stably for a long time.

The hydrogenation is carried out under the conditions of 280° to 400° C., preferably 280° to 380° C., of reaction temperature, 20 to 200 kg/cm$^2$·G, preferably 50 to 200 kg/cm$^2$·G, of hydrogen pressure, 0.1 to 10 l/l·hr$^{-1}$, preferably 0.2 to 2 hrs$^{-1}$, of LHSV, and 500 to 2000 Nl/liter, preferably 800 to 1500 Nl/liter, of hydrogen to liquid ratio (hereinafter referred to as "G/L"). In the ranges mentioned above, specific conditions of the hydrogenation are selected so that the ratio of hydrogenation will fall at a prescribed level. If the reaction temperature exceeds 400° C., thermal decomposition of pitch due to the excessively high temperature intensifies suddenly so much as to predominate over the slight hydrogenation aimed at. The deposition of carbon on catalyst also tends to be accelerated when the reaction temperature exceeds 400° C. If the reaction temperature is held down below 200° C., the hydrogenation cannot be effected to the prescribed extent.

As regards the reaction temperature during the initial stage of hydrogenation, selection of this temperature in the range of 280° to 380° C. proves to be effective in preventing the deactivation of catalyst. When the reaction temperature is below 380° C., the deposition of carbon on the catalyst occurs very slowly and the deactivation of the catalyst is notably repressed, and the operation is continued stably for a long time. When the hydrogenation is carried out at a temperature in the range of 360° to 400° C. under pressure of 30 to 110 kg/cm$^2$·G, such hetero atoms as nitrogen and sulfur are selectively removed and carbon condensation rings are hydrogenated to a relatively low extent and the produced tar pitch makes a highly desirable carbonaceous raw material.

The hydrogenation can be performed on a fixed bed, a suspended bed, or a ebulleited bed. Commercially, the use of a fixed bed proves to be more advantageous in terms of convenience of operation, reliability of operation, cost of equipment, and cost of operation.

The hydrogenation may be carried out in the presence of a hydrogenation solvent. Since the hydrogenation catalyst used essentially in the hydrogenation possesses an ample hydrogenating ability and experiences no appreciable deposition of carbon, the presence of a hydrogenation solvent is not necessary.

The present invention aims to attain slight hydrogenation of coal tar pitch. Specifically, the terms "slight hydrogenation" used herein means hydrogenation degree defined as the difference of hydrogen to carbon atomic ratio between the pitch as the raw material and the product of hydrogenation falls in the range of 0.03 to 0.5, preferably 0.05 to 0.45, more preferably 0.05 to 0.35.

By the hydrogenation treatment of this invention, the coal tar pitch is partially hydrogenated under the state remaining a most of carbon condensed rings and compounds containing hetero atoms such as N, S, etc. are decomposed in a relatively large proportion. The hydrogenated product in the present invention consists of a hydrogenated tar pitch and a by-produced light fraction and the hydrogenated product or hydrogenated tar pitch is suitable for carbonaceous raw materials for pitch coke, particularly needle coke, carbon fiber and the like. Further, when the hydrogenated tar pitch is obtained from the hydrogenated product by distillation, the distilled light fraction is rich in two or three rings of aromatic and naphthenic hydrocarbons and is suitable for raw materials of carbon black.

Now, the present invention will be described more specifically below with reference to working examples.

EXAMPLE 1

At 80° C., 3 parts of coal tar pitch (softening point 36° C.) and 1 part of aromatic type tar oil (boiling point 190° to 300° C.) were mixed at 80° C. Then, the resultant mixture was further mixed with 1 part of aliphatic type hydrocarbon gasoline (boiling range 150° to 250° C.), and QI was precipitated and went to the bottom. The supernatant consequently precipitated was distilled to obtain pitch having a softening point of 33.5° C. (hereinafter referred to as "UP"). By this treatment with the solvent, QI was substantially completely removed and TI was retained at a ratio of 84.3%. The other properties were retained substantially intact. The properties of UP are shown in Table 1.

In a fixed-bed type isothermal continuous hydrogenation apparatus, UP was subjected to slight hydrogenation in the presence of Catalyst A indicated in Table 2. This hydrogenation was started at an initial temperature of 315° C. under the conditions of 180 kg/cm$^2$·G of hydrogen pressure, 0.4 hr$^{-1}$ of LHSV, and 1000 Nl/liter of G/L. Gradual deactivation of the catalyst which ensued was compensated by elevating the reaction temperature by steps. The operation was continued in such a manner that hydrogenation degree defined as difference of hydrogen to carbon atomic ratio between UP and hydrogenated product (it may be called ΔH/C) would be kept at 0.2. The operation was completed when the reaction temperature reached 400° C. Surprisingly, the total length of operation time was about 6,000 hours.

Figure 1:
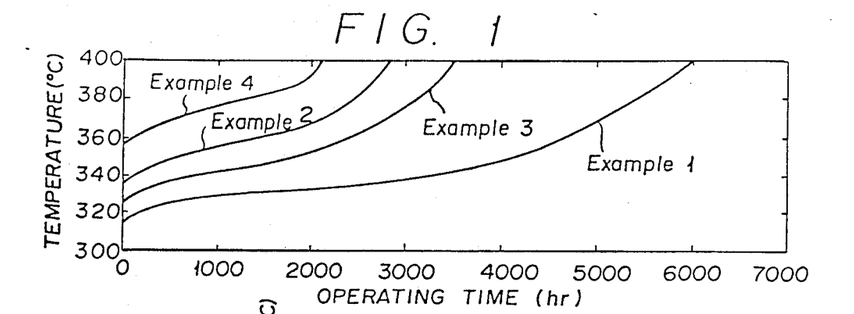
FIG. 1 is a graph showing the relation between the operating time and the reaction temperature obtained in working examples of the hydrogenation by the method of the present invention.

The progress of this operation is shown in FIG. 1. In this experiment, the hydrogenated tar pitch produced at any point through out the entire operation time possessed substantially equal properties because the operation was continued so as to retain the ratio of hydrogenation at 0.2. The attributes of the hydrogenated tar pitch produced at the 1,000th hour of the operation time are shown by way of example in Table 1. The slightly hydrogenated product as described above was distilled to expel about 21% by weight of a light fraction and obtain hydrogenated tar pitch having a softening point of 40° C.

As shown in Table 1, the hydrogenated tar pitch had an average molecular weight of about 300 which was nearly equal to the average molecular weight of UP as the raw material. The H/C, aromaticity, and number of naphthene rings which were originally 0.69, 0.91, and 0.50 respectively in the UP as the raw material were changed to 0.80, 0.75, and 2.5 respectively in the hydrogenated tar pitch, indicating that the slight hydrogenation gave rise to pitch which was partially hydrogenated while its polycyclic condensation configuration kept intact and consequently was given properties advantageous for the pitch to be used as a carbonaceous raw material. Further in the hydrogenated tar pitch, the contents of hetero atoms such as N, S, and O and those of sodium and iron were found to have been reduced notably, rendering the properties of the hydrogenated tar pitch all the more desirable for the carbonaceous raw material.

CONTROL 1

The slight hydrogenation of UP was carried out by following the procedure of Example 1, except that the conditions were changed to 425° C. of reaction temperature, 100 kg/cm²·G of hydrogen pressure, and 5.0 hr⁻¹ of LHSV. After about 50 hours following the start of operation, hydrogenation degree was 0.22 and the hydrogenated tar pitch was found to be suitable for a carbonaceous raw material. After about 200 hours of continued operation, however, hydrogenation degree fell to 0.04. The data indicate that at the temperature above 400° C., a large amount of carbon was deposited on the catalyst and the catalyst was consequently deactivated so heavily that the operation could not be continued stably for a long time.

CONTROL 2

The slight hydrogenation of UP was carried out by following the procedure of Example 1, except that the conditions were changed 240° C. of initial reaction temperature, 200 kg/cm²·G of hydrogen pressure, 0.1 hr⁻¹ of LHSV, and 1000 Nl/liter of G/L. Substantially no hydrogenation ensued in this experiment.

EXAMPLE 2

The slight hydrogenation of UP was carried out by following the procedure of Example 1, except that Catalyst B shown in Table 2 was used instead and the hydrogenation was started at an initial reaction temperature of 335° C. under the conditions of 80 kg/cm²·G of hydrogen pressure, 0.3 hr⁻¹ of LHSV, and 1000 Nl/liter of G/L. The ensuring deactivation of the catalyst was compensated by gradually elevating the reaction temperature. The operation was continued for a long time with hydrogenation degree being kept at 0.2. The operation was terminated when the operation time was about 2,800 hours. The progress of the operation is shown in FIG. 1.

EXAMPLE 3

The slight hydrogenation of UP was carried out by following the procedure of Example 1, except that Catalyst C indicated in Table 2 was used instead and the hydrogenation was started at an initial reaction temperature of 325° C. under the conditions of 100 kg/cm²·G of hydrogen pressure, 0.3 hr⁻¹ of LHSV, and 1000 Nl/liter of G/L.

The ensuring deactivation of the catalyst was compensated by gradually elevating the reaction temperature. The operation was continued for a long time with the hydrogenation degree being retained at 0.2. The operation was terminated when the reaction temperature reached 400° C. The total length of the operation time was about 3,500 hours. The progress of the operation is shown in FIG. 1.

TABLE 1

|  | UP | Hydrogenated tar pitch |
|---|---|---|
| Softening point (°C.) | 33.5 | 40.0 |
| Specific gravity | 1.227 (20° C.) | 1.19 (25° C.) |
| Viscosity (C.P.) | 20 (140° C.) | 45 (140° C.) |
| Conradson carbon residue (wt %) | 33.4 | 26.2 |
| QI (wt %) | 0.0 | 0.0 |
| TI (wt %) | 8.6 | 2.8 |

TABLE 1-continued

|  | UP | Hydrogenated tar pitch |
|---|---|---|
| C (wt %) | 91.55 | 92.11 |
| H (wt %) | 5.25 | 6.12 |
| N (wt %) | 1.2 | 0.9 |
| S (wt %) | 0.55 | 0.13 |
| O (wt %) | 1.60 | 0.80 |
| Na (wt ppm) | 43 | 3.0 |
| Fe (wt ppm) | 8 | 1.3 |
| H/C (atomic ratio) | 0.69 | 0.80 |
| Average molecular weight | 295 | 281 |
| Aromaticity | 0.91 | 0.75 |
| Number of carbon atoms in side chain | 1.7 | 1.7 |
| Number of aromatic rings | 4.9 | 3.0 |
| Number of naphthene rings | 0.5 | 2.5 |

TABLE 2

|  | Catalyst A | Catalyst B | Catalyst C |
|---|---|---|---|
| Composition |  |  |  |
| Al₂O₃ (wt %) | 74.3 | 71.4 | 70.3 |
| P₂O₅ (wt %) | 2.3 | — | 5.8 |
| MoO₃ (wt %) | 19.8 | 18.0 | 20.2 |
| NiO (wt %) | 3.6 | 6.0 | 3.9 |
| B₂O₃ (wt %) | — | 4.6 | — |
| Physical properties |  |  |  |
| Surface area (m²/g) | 160 | 161 | 190 |
| Pore volume (cc/g) | 0.50 | 0.462 | 0.43 |
| Average pore diameter (Å) | 125 | 115 | 91 |

EXAMPLE 4

In a fixed-bed type continuous hydrogenation apparatus, UP of a softening point of 32° C. shown in Table 4 was subjected to slight hydrogenation in the presence of a varying catalyst shown in Table 3 and Catalyst B of Table 2 under the conditions of 140 kg/cm²·G of hydrogen pressure, 0.3 hr⁻¹ of LHSV, and 1000 Nl/liter of G/L. The ensuing deactivation of the catalyst was compensated by elevating the reaction temperature so as to keep the hydrogenation degree at 0.18. The operation time which implies the service life of the catalyst begins with the start of the operation and ends with the arrival of the reaction temperature to 400° C. The operation time for each of the catalysts used is shown in Table 5. The properties of the hydrogenated tar pitch resulting from the separation of light fraction from the product of the hydrogenation using Catalyst D are shown in Table 4.

TABLE 3

| Catalyst | D | E | F | G | H | I | Y |
|---|---|---|---|---|---|---|---|
| Composition (wt %) |  |  |  |  |  |  |  |
| Al₂O₃ | 72.9 | 81.3 |  | 72.1 | 81.0 | 88.5 | 88.4 |
| SiO₂ |  |  | 81.6 | 4.5 |  |  | 0.6 |
| MoO₃ | 20.0 | 15.8 | 15.4 | 19.0 | 15.0 | 10.6 | 17.2 |
| NiO | 3.9 | 2.9 | 3.0 |  |  | 0.7 | 3.8 |
| CoO |  |  |  | 4.4 | 4.0 | 10.2 |  |
| P₂O₅ | 3.2 |  |  |  |  |  |  |
| Specific surface area (m²/g) | 190 | 270 | 225 | 180 | 260 | 224 |  |
| Pore volume (cc/g) | 0.43 | 0.54 | 0.50 | 0.47 | 0.51 | 0.66 |  |

TABLE 4

|  | UP | Hydrogenated tar pitch |
|---|---|---|
| Specific gravity (at 20° C.) | 1.23 | 1.21 |
| Viscosity (at 140° C.) (C.P.) | 20 | 218 |
| Softening point (°C.) | 32 | 81.5 |

TABLE 4-continued

|  | UP | Hydrogenated tar pitch |
|---|---|---|
| CCR*[1] (wt %) | 31.0 | 33.3 |
| Toluene insolubles (wt %) | 9.2 | 2.3 |
| Molecular weight | 290 | 303 |
| Elementary analysis |  |  |
| C (wt %) | 92.3 | 92.3 |
| H (wt %) | 5.1 | 5.6 |
| N (wt %) | 1.1 | 0.83 |
| S (wt %) | 0.57 | 0.13 |
| Na (wt ppm) | 46 | 3.0 |
| Aromaticity | — | 0.78 |
| Number of carbon atoms in side chain | — | 1.5 |
| Number of aromatic rings | — | 4.0 |
| Number of naphthene rings | — | 2.5 |

*[1]CCR for Conradson carbon residue

TABLE 5

| Catalyst | Operation time (hrs) |
|---|---|
| B | 4200 |
| D | 3900 |
| E | 3500 |
| F | 3400 |
| G | 4000 |
| H | 3000 |
| I | 3700 |

EXAMPLE 5

The slight hydrogenation was carried out by following the procedure of Example 1, except that Catalyst Y shown in Table 3 and the reaction conditions were changed to those shown in Table 6. The results are shown in Table 6.

TABLE 6

| Run No. | 1 | 2 | 3 | 4 | 5 | 6 | 7 |
|---|---|---|---|---|---|---|---|
| Reaction conditions |  |  |  |  |  |  |  |
| Temperature (°C.) | 400 | 400 | 360 | 320 | 350 | 325 | 360 |
| Hydrogen pressure (kg/cm² · G) | 60 | 60 | 90 | 180 | 180 | 90 | 180 |
| LHSV (hr$^{-1}$) | 0.5 | 0.2 | 0.2 | 0.5 | 1.0 | 0.2 | 0.5 |
| G/L (Nl/liter | 1000 | 1000 | 1000 | 1000 | 1000 | 1000 | 1000 |
| Result of reaction |  |  |  |  |  |  |  |
| ΔH/C (atomic ratio) | 0.125 | 0.185 | 0.300 | 0.125 | 0.185 | 0.185 | 0.300 |
| Ratio of nitrogen removal (%) | 38 | 47 | 59 | 26 | 30 | 37 | 55 |

EXAMPLE 6

To a first fixed-bed reactor packed with a porous inorganic porous oxide having carried thereon a component possessing the properties shown in Table 7 and exhibiting activity for hydrogenation, UP of the properties of Table 8 was fed in conjunction with hydrogen under the conditions of 330° C. of initial reaction temperature, 140 kg/cm²·G of hydrogen pressure, 1.0 hr$^{-1}$ of LHSV, and 1000 Nl/liter of G/L to effect removal of sodium compounds as first treatment. The product from this first treatment at 500 hours of the operation time was found to possess the properties shown in Table 8. After the supply of UP was started, the temperature of the first reactor was gradually elevated so as to keep the ratio of Na removal from UP of the first treatment at about 84%.

TABLE 7

| Composition | Inorganic porous oxide having carried thereon component active for hydrogenation | Catalyst J |
|---|---|---|
| Al$_2$O$_3$ (wt %) | 93.0 | 69.8 |
| MoO$_3$ (wt %) | 5.0 | 20.1 |
| CoO (wt %) | 2.0 | — |
| NiO (wt %) | — | 4.5 |
| P$_2$O$_5$ (wt %) | — | 5.6 |
| Surface area (m²/g) | 143 | 198 |
| Pore volume (cc/g) | 0.67 | 0.43 |
| Average pore diameter (Å) | 187 | 87 |
| Bulk density (g/cc) | 0.650 | 0.83 |

TABLE 8

|  | UP | Product from first treatment | Product from second treatment |
|---|---|---|---|
| Specific gravity (d$_{20}$/4° C.) | 1.23 | 1.22 | 1.19 |
| Na (wt ppm) | 62 | 9.9 | 3 |
| N (wt %) | 1.15 | 1.04 | 0.74 |
| S (wt %) | 0.53 | 0.32 | 0.11 |
| H/C (atomic ratio) | 0.68 | 0.75 | 0.88 |
| Hydrogenation degree (ΔH/C) | — | 0.07 | 0.20 |

Then, to a second fixed-bed reactor packed with Catalyst J indicated in Table 7, the oil obtained from the first treatment described above was fed in conjunction with hydrogen under the conditions of 140 kg/cm²·G of hydrogen pressure, 0.5 hr$^{-1}$ of LHSV, and 1000 Nl/liter of G/L. In this case, the reaction temperature was gradually elevated from 335° C. so as to keep the hydrogenation degree (ΔH/C total) of the product from the second reactor at 0.2. The oil produced by this second reaction, after 500 hours of continued operation, was found to possess the properties shown in Table 8.

The total hydrogen consumption during the course of the first reaction was 246 Nl/liter. The yield of the hydrogenated tar pitch (softening point 40° C.) obtained by depriving the product from the second reactor of the light fraction was 79.0% by weight and the H/C was 0.8.

For comparison, the procedure of the experiment described above was repeated, except that UP as raw material was fed not to first reactor but directly to the second reactor packed with Catalyst J with the liquid space velocity fixed at 0.3 hr$^{-1}$. The liquid space velocity of 0.3 hr$^{-1}$ involved in this comparative experiment corresponded to a treatment performed by feeding the same amount of UP through a catalyst of an amount equaling the total of the amounts of catalysts used in the first and second reactors in the experiment of Example 6. In this comparative experiment, hydrogenation degree (ΔH/C) was 0.20 and the hydrogen consumption was 246 Nl/liter 500 hours after the start of the reaction. The yield of the hydrogenated tar pitch (softening point 40° C.) obtained by depriving the product of hydrogenation of the light fraction was 75% by weight and the H/C was about 0.77.

Figure 2:
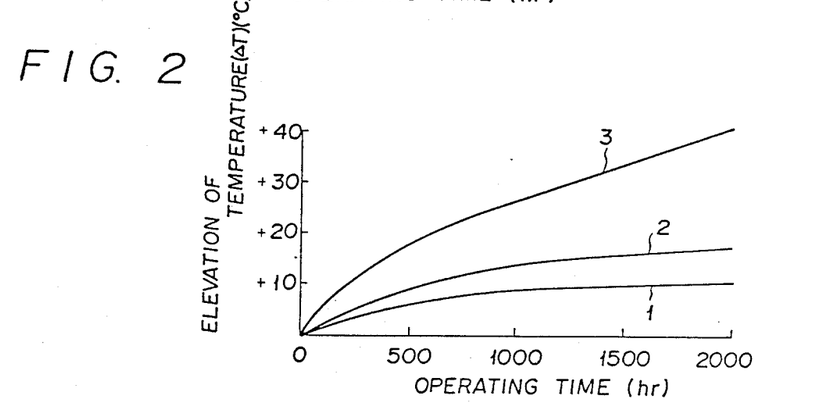
FIG. 2 is a graph showing the relation between the operating time and the elevation of temperature.

The results of the aforementioned experiment are shown graphically in FIG. 2. In this graph, the horizontal axis represents the scale of operation time (hr) and the vertical axis the scale of the elevation of the standard reaction temperature. Curve 1 represents the results obtained by elevating the temperature of the first reactor so that the ratio of Na removal in the first reactor would be kept at 84% and the Na content in the product from the first treatment would be kept below 10 ppm. Curve 2 represents the results obtained by elevating the temperature of the second reactor so that the hydrogenation degree (ΔH/C total) of the product obtained from the second reactor would be kept at 0.20. Curve 3 represents the results obtained in the comparative experiment by elevating the reaction temperature so that the hydrogenation degree of the produced oil would be kept at 0.20.

EXAMPLE 7

Coal tar having a density of 1.157 g/cm³ at 40° C. was distilled while sodium hydroxide was continuously added thereto in the form of an aqueous solution in a proportion of 210 ppm. The coal tar pitch consequently formed was withdrawn as bottoms. The coal tar pitch was treated to remove QI and produce UP having a softening point of 35.6° C. and H/C (atomic ratio) of 0.68.

This UP was subjected to hydrogenation in the presence of a Ni-MO/Al₂O₃ type hydrogenation catalyst (extrusion molded in cylinders 0.8 mm in diameter) having a composition (% by weight) of 18.0% of $MoO_3$, 4.5% of NiO, 6.0% of $P_2O_5$, and 71.5% of $Al_2O_3$. This reaction was performed in a flow type high-pressure reactor packed with 20 cc of the catalyst. The reactor was operated under the conditions of 180 kg/cm²·G of hydrogen pressure, 0.3 hr$^{-1}$ of LHSV, and 1,000 Nl/liter of G/L. During the course of the reaction, the reaction temperature was gradually elevated from the initial level of 340° C. to compensate for the deactivation of the catalyst and keep the H/C (atomic ratio) at 0.93.

The operation time during the elevation of the reaction temperature from 340° C. to 360° C. was 2,000 hours. When the hydrogenation was performed by following the procedure described above, except that coal tar having a density of 1.138 g/cm³ at 40° C. was used instead. In this experiment, the operation time during the elevation of the reaction temperature from 340° to 360° C. was about 1,000 hours.

EXAMPLE 8

Coal tar was distilled while sodium hydroxide was continuously added thereto in the form of aqueous solution in a proportion of 210 ppm. The coal tar pitch consequently formed was withdrawn as bottoms. This coal tar pitch was treated with a solvent to remove QI and produce UP having the properties shown in Table 9.

TABLE 9

| Specific gravity (d₂₀/4° C.) | 1.23 |
|---|---|
| Na (ppm) | 62 |
| N (wt %) | 1.15 |
| S (wt %) | 0.52 |
| H/C (atomic ratio) | 0.65 |

Figure 3:
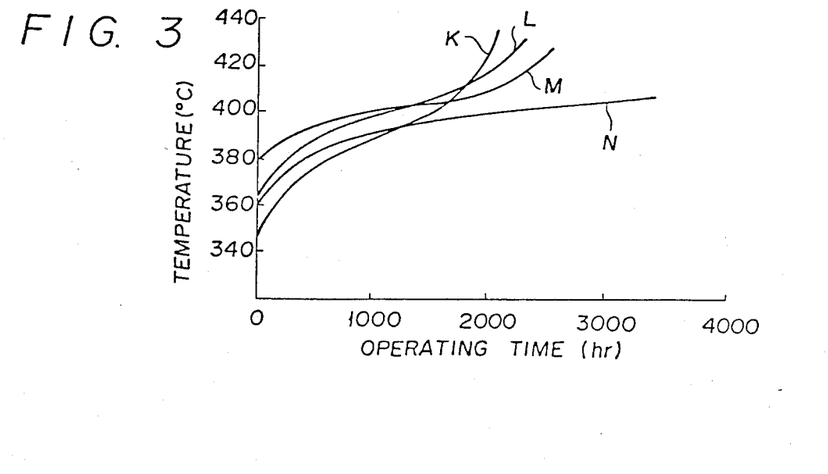
FIGS. 3, 4 and 5 are graphs showing the relation between the operating time and the reaction temperature.

The UP mentioned above was subjected to hydrogenation by using variously manufactured catalyst (extrusion molded in cylinders 0.8 mm in diameter) possessing the properties indicated in Table 10. The hydrogenation was carried out in a fixed-bed type flow high-pressure reactor packed with 20 cc of the catalyst. The reactor was operated under the conditions of 180 kg/cm²·G of hydrogen pressure, 0.5 hr$^{-1}$ of LHSV (liquid space velocity), and 1000 Nl/liter of G/L. The ensuing deactivation of the catalyst was compensated by elevating the reaction temperature so as to keep the H/C (atomic ratio) of the product at 0.92. The results of the operation by the use of four catalysts are shown in FIG. 3. It is noted from this graph that Catalysts M and N having an average pore diameter of not less than 50 Å, and a pore volume of not less than 0.3 cc/g are deactivated at low speed, and especially Catalyst N having a catalyst metal content of not less than 7.5% by weight is deactivated at low speed.

TABLE 10

| Catalyst | K | L | M | N |
|---|---|---|---|---|
| Composition (% by weight) | | | | |
| $MoO_3$ | 18.0 | 18.0 | 5.0 | 18.0 |
| NiO | 4.5 | 4.5 | 1.0 | 4.5 |
| $P_2O_5$ | 6.0 | 6.0 | 7.0 | 6.0 |
| $Al_2O_3$ | 71.5 | 71.5 | 87.0 | 71.5 |
| Surface area (m²/g) | 284 | 136 | 212 | 161 |
| Pore volume (cc/g) | 0.331 | 0.277 | 0.552 | 0.462 |
| Average pore diameter (Å) | 47 | 92 | 104 | 115 |

EXAMPLE 9

Figure 4:
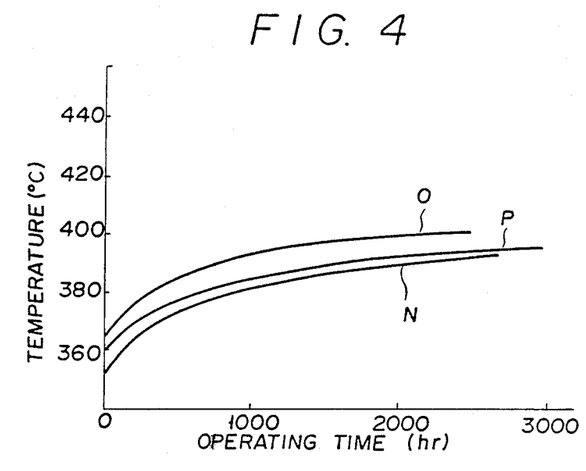

The UP possessing the properties shown in Table 12 was subjected to hydrogenation in the presence of the three catalysts shown in Table 11 under the conditions of 90 kg/cm²·G of hydrogen pressure, 0.5 hr$^{-1}$ of LHSV, and 1000 Nl/liter of G/L. In this experiment, the reaction temperature was gradually elevated so as to keep the H/C of the hydrogenated product at 0.87. The results of the reactions with the three catalysts are shown in FIG. 4. These catalysts were invariably extrusion molded in trilobes 1.3 mm in diameter. It is noted from FIG. 4 that these three catalysts exhibited stable activity for a long time.

TABLE 11

| Catalyst | N | O | P |
|---|---|---|---|
| Composition (% by weight) | | | |
| $WO_3$ | — | 20.0 | — |
| $MoO_3$ | 18.0 | — | 16.0 |
| NiO | 4.5 | 5.1 | — |
| CoO | — | — | 4.0 |
| $B_2O_3$ | 6.0 | — | — |
| $Al_2O_3$ | 71.5 | 74.7 | 80.0 |
| Specific surface area (m²/g) | 161 | 220 | 215 |
| Pore volume (cc/g) | 0.462 | 0.503 | 0.425 |
| Average pore diameter (Å) | 115 | 87 | 79 |

TABLE 12

| Specific gravity (d₂₀/4° C.) | 1.24 |
|---|---|
| Na (ppm) | 38 |
| N (wt %) | 1.12 |
| S (wt %) | 0.58 |
| H/C (atomic ratio) | 0.66 |

EXAMPLE 10

Figure 5:
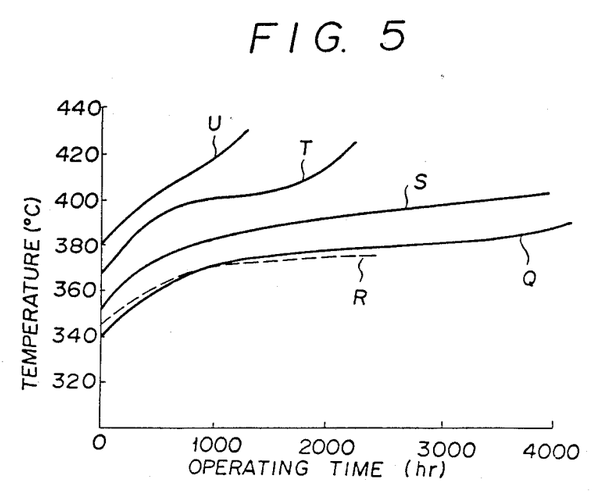

In accordance with the method disclosed in the specification of U.S. Pat. No. 4,248,852, γ-alumina molds of five types having varying pore diameter were prepared, impregnated with titanium chloride, phosphoric acid, etc., dried and calcined to obtain solid acid carriers. They were impregnated with a mixed solution of ammonium paramolybdate or phosphorustungstic acid and nickel nitrate, dried, and then calcined to afford five catalysts indicated in Table 13. The UP possessing the attributes shown in Table 12 was subjected to hydrogenation using the catalysts. During the hydrogenation, the reaction temperature was gradually elevated to compensate the deactivation of the catalyst so as to keep the H/C of the hydrogenated product at 0.87. The hydrogen pressure was 180 kg/cm²·G, the LHSV 0.5 hr⁻¹, and the hydrogen/liquid ratio 1000 Nl/liter. The results of the hydrogenation using the five types of catalysts are shown in FIG. 5. The catalysts were invariably extrusion molded in cylinders 1/32 inch in diameter. It is noted from FIG. 5 that the Catalysts Q, R and S having pore diameters of 50 to 250 Å were deactivated at low speeds.

TABLE 13

| Catalyst | Q | R | S | T | U |
|---|---|---|---|---|---|
| Composition (% by weight) | | | | | |
| $MoO_3$ | 16.0 | 14.6 | — | 16.5 | 15.9 |
| $WO_3$ | — | — | 20.2 | — | — |
| $NiO_2$ | 3.9 | 3.0 | 6.0 | 3.3 | 3.5 |
| $TiO_2$ | — | 6.0 | — | — | — |
| $P_2O_5$ | 5.8 | — | 5.3 | 4.6 | 5.5 |
| $Al_2O_3$ | 74.3 | 75.9 | 68.5 | 75.6 | 75.1 |
| Surface area (m²/g) | 190 | 123 | 115 | 106 | 90 |
| Pore volume (cc/g) | 0.369 | 0.413 | 0.584 | 0.698 | 0.725 |
| Average pore diameter (Å) | 78 | 134 | 203 | 263 | 322 |

The values for QI reported herein are were measured by the following method referring to JIS K 2425:

Ten gram of sample is dissolved in 200 mls of warm quinoline in a tube and heated at a temperature of 80° C. for 30 minutes. Then the tube is set at a certifugal separator and is subjected to centrifugation at 2000 G for 20 minutes. The tube is removed and inclined to flow supernatant liquid not so as to flow the precipitate. About 50 ml of solution is remained in the tube. 150 ml of quinoline is added to the tube and the solution is stirred by a glass rod, and then a leading end portion of the rod is washed with 50 ml of quinoline into the tube. The tube is set to the certifugal separator again and is subjected to centifugation similarly. Such procedure is further carried out four times with quinoline and two times withe acetone. The tube is heated on water bath at 50° C. to remove major portion of solvent and then dried in a diver at about 110° C. for 30 minutes and further cooled in a decicator. Then mass is measured and quinoline soluble content is calculated.

It is to be understood that the invention is not to be limited to the exact details of operation or exact compounds, compositions, methods, or procedures shown and described, as various modifications and equivalents will be apparent to one skilled in the art.

We claim:

1. A method for converting coal tar pitch, containing 5 to 60% by weight of toluene insolubles having undergone treatment for the removal of quinoline insolubles, to a hydrogenated coal tar pitch which comprises:
    subjecting said coal tar pitch in a fixed bed reactor to continuous hydrogenation in the presence of a hydrogenation catalyst having carried on a refractory inorganic oxide carrier at least one member selected from the class consisting of elemental metals belonging to Groups VI B and VIII in the Periodic Table and oxides and sulfides thereof under the conditions of 280 degrees to 380 degrees C. of reaction temperature, 50 to 200 kg/cm²·G of hydrogen pressure, 0.1 to 10 l/l-hr of LHSV and 500 to 2,000 Nl/liter of hydrogen to liquid ratio, wherein said hydrogenation catalyst has a pore volume of not less than 0.3 cc/g, a surface area of 50 to 300 m²/g, and an average pore diameter in the range of 50 to 250 Å, the catalyst contains 15 to 35 percent by weight of a metal of said Groups containing at least molybdenum as oxide, and the carrier is formed mainly of alumina, and wherein said hydrogenation is carried out in the range of 0.05 to 0.35 of hydrogenation degree defined as difference of hydrogen to carbon atomic ratio between said coal tar pitch before hydrogenation and the hydrogenated product; said hydrogenation being effective to produce a coal tar pitch suitable as carbonaceous raw material possessing a structure having nuclei partially hydrogenated while retaining polycyclic condensation configuration intact, containing hetero atoms and metals at low concentrations.

2. A method according to claim 1 in which the treatment for removal of quinoline insolubles comprises adding to the coal tar pitch in a mixed solvent comprising an aliphatic solvent and an aromatic solvent and recovering coal tar pitch containing generally in the order of not more than 1000 ppm of solids.

3. A method according to claim 1 in which the coal tar pitch is obtained by distillation of coal tar having a density in the range of 1.13 to 1.17 g/cm² at 40 degrees C.

4. A method according to claim 3 in which the coal tar pitch is obtained by distillation of coal tar having a density of at least 1.150 g/cm² at 40 degrees C.

5. A method according to claim 1 in which the coal tar pitch is not alkylated.

6. A method for continuous hydrogenation of coal tar pitch containing 5 to 60% by weight of toluene insolubles and not more than about 1000 ppm of quinoline insolubles to a degree such that the difference of hydrogen to carbon atomic ratio between the untreated coal tar pitch and the hydrogenated coal tar pitch falls in the range of 0.03 to 0.5, which method comprises:
    subjecting said coal tar pitch containing toluene insolubles to said continuous hydrogenation in the presence of a hydrogenation catalyst which (a) comprises, carried on a refractory inorganic oxide carrier, at least one member selected from the class consisting of elemental metals belonging to the Groups VI B and VIII in the Periodic Table of elements and oxides and sulfides thereof, (b) comprises molybdenum, (c) comprises 7.5 to 35 percent by weight of said carried metals to total based on an oxide, and (d) has 50 to 300 m²/g of surface area and 0.3 to 1.5 cc/g of pore volume, and 50 to 150 Å of pore diameter.

7. A method according to claim 6 in which the coal tar pitch is not alkylated.

8. A method of claim 1 in which the catalyst contains a metal of group VI B in an amount falling within the range of 6 to 30% by weight as metal oxide and a metal of group VIII in the amount in the range of 1.5 to 6% by weight as metal oxide, the total amount of metal as metal oxide being in the range of 15 to 35% by weight.

9. A method of claim 8 in which the catalyst has an average pore diameter between about 80 and 150 A.

* * * * *

UNITED STATES PATENT AND TRADEMARK OFFICE
CERTIFICATE OF CORRECTION

Page 1 of 2

PATENT NO. : 4,909,923
DATED : March 20, 1990
INVENTOR(S) : Hiroshi Okazaki, Tadashi Komoto, Munekazu Nakamura, Osamu Togari, Noriyuki Yoneda, Haruhiko Yoshida, Hideki Hashimoto It is certified that error appears in the above-identified patent and that said Letters Patent is hereby corrected as shown below:

Title page [30] Foreign Application Priority Data, line 5; "59-226368" should read -- 59-226638 --.
Title Page [56] References Cited, U.S. Patent Documents, line 5 "4,328,090 5/1989" should read -- 4,328,090 5/1982 --.
Column 2, line 22; "hydrogen donating" should read -- hydrogen-donating --.
Column 2, line 23; "expensive but" should read -- expensive, but --.
Column 2, line 24/25; "hydrogenation both insufficiently because" should read -- hydrogenation, both insufficiently, because --.
Column 4, line 18; delete "a".
Column 4, line 26; "the" should read -- a --.
Column 4, line 28; "thereon. The" should read -- thereon, the --.
Column 4, line 50; "undersired" should read -- undesired --.
Column 5, line 38; "as," should read -- as --.
Column 5, line 40; "as," should read -- as --.
Column 6, line 25; "has carried" should read -- has, carried --.
Column 6, line 26; "carrier at" should read -- carrier, at --

Column 8, line 58; "material" should read -- materials --.
Column 9, line 23; "changed 240°" should read -- changed to: 240° --.
Column 9, line 35; "ensuring" should read -- ensuing --.
Column 9, line 51; "ensuring" should read -- ensuing --.
Column 12, line 47; "reactor but" should read -- reactor, but --.
Column 15, line 24; "are were" should read -- were --.
Column 15, line 28; "certifugal" should read -- centrifugal --.
Column 15, line 36; "certifugal" should read -- centrifugal --.

UNITED STATES PATENT AND TRADEMARK OFFICE
CERTIFICATE OF CORRECTION

PATENT NO. : 4,909,923
DATED : March 20, 1990
INVENTOR(S) : Hiroshi Okazaki, Tadashi Komoto, Munekazu Nakamura, Osamu Togari, Noriyuki Yoneda, Haruhiko Yoshida, Hideki Hashimoto It is certified that error appears in the above-identified patent and that said Letters Patent is hereby corrected as shown below:

Column 15, line 37; "centifugation" should read -- centrifugation --.
Column 15, line 39; "withe" should read -- with --.
Column 15, line 39; "on water" should read -- on a water --.
Column 15, line 40; "remove major" should read -- remove the major --.
Column 15, line 41; "a diver" should read -- a drier --.
Column 15, line 42; "decicator" should read -- desiccator --.

Signed and Sealed this

Seventh Day of May, 1991

Attest:

HARRY F. MANBECK, JR.

*Attesting Officer*      Commissioner of Patents and Trademarks

UNITED STATES PATENT AND TRADEMARK OFFICE
CERTIFICATE OF CORRECTION

PATENT NO. : 4,909,923

DATED : March 20, 1990

INVENTOR(S) : Hiroshi Okazaki, Tadashi Komoto, Munekazu Nakamura, Osamu Togari, Noriyuki Yoneda, Haruhiko Yoshida and Hideki Hashimoto It is certified that error appears in the above-identified patent and that said Letters Patent is hereby corrected as shown below:

Col. 7, line 43; "a ebulleited" should read -- an ebullient -- (ebulleited is a mispelling of ebullient which means agitated or, in other words, a shaking bed)

Signed and Sealed this

Eighteenth Day of August, 1992

*Attest:*

DOUGLAS B. COMER

*Attesting Officer*  *Acting Commissioner of Patents and Trademarks*